(12) United States Patent
Jayne et al.

(10) Patent No.: US 10,704,380 B2
(45) Date of Patent: Jul. 7, 2020

(54) SYSTEM AND METHOD FOR DETECTING CROSS BORES

(71) Applicant: ULC Robotics, Inc., Hauppauge, NY (US)

(72) Inventors: John L. Jayne, Hauppauge, NY (US); G. Gregory Penza, Old Field, NY (US); Robert E. Kodadek, III, Long Beach, NY (US)

(73) Assignee: ULC Robotics, Inc., Hauppauge, NY (US)

( * ) Notice: Subject to any disclaimer, the term of this patent is extended or adjusted under 35 U.S.C. 154(b) by 357 days.

(21) Appl. No.: 15/926,185

(22) Filed: Mar. 20, 2018

(65) Prior Publication Data

US 2018/0274358 A1 Sep. 27, 2018

Related U.S. Application Data

(60) Provisional application No. 62/474,769, filed on Mar. 22, 2017.

(51) Int. Cl.
| | | |
|---|---|---|
| *E21B 47/09* | (2012.01) | |
| *E21B 47/01* | (2012.01) | |
| *E21B 47/08* | (2012.01) | |
| *G01N 27/22* | (2006.01) | |
| *E21B 7/04* | (2006.01) | |
| *F16L 101/30* | (2006.01) | |
| *F16L 1/11* | (2006.01) | |
| *E21B 47/117* | (2012.01) | |

(52) U.S. Cl.
CPC ............. *E21B 47/09* (2013.01); *E21B 47/01* (2013.01); *E21B 47/08* (2013.01); *G01N 27/22* (2013.01); *E21B 7/046* (2013.01); *E21B 47/117* (2020.05); *F16L 1/11* (2013.01); *F16L 2101/30* (2013.01)

(58) Field of Classification Search
CPC .......... E21B 47/09; E21B 47/01; E21B 47/08; G01N 27/22
See application file for complete search history.

(56) References Cited

U.S. PATENT DOCUMENTS

| | | |
|---|---|---|
| 8,555,722 B2 | 10/2013 | Ersoy et al. |
| 8,988,969 B2 | 3/2015 | Wallbom et al. |
| 9,534,490 B2 | 1/2017 | Farrag et al. |
| 2010/0301866 A1 | 12/2010 | Blessum et al. |
| 2016/0265347 A1 | 9/2016 | Gunsaulis et al. |
| 2018/0363827 A1* | 12/2018 | Vreenegoor ....... G01R 33/0005 |

* cited by examiner

*Primary Examiner* — David Z Huang
(74) *Attorney, Agent, or Firm* — Brooks Kushman P.C.

(57) ABSTRACT

An apparatus for detecting a cross-bore between a first pipe and a second pipe that are installed underground includes a support and an electronic circuit assembly. The support is movable through the first pipe. The electronic circuit assembly is mounted to the support to move through the first pipe with the support. The electronic circuit assembly includes a controller and a capacitance sensor. The capacitance sensor outputs a capacitance value based on an interaction of an electric field generated by the capacitance sensor with an environment of the first pipe. The capacitance sensor outputs to the controller a given capacitance value when the capacitance sensor is at a location where the environment of the first pipe is a cross-bore intersection with the second pipe. The controller generates an indicator indicative of a presence of a cross-bore upon the capacitance sensor outputting the given capacitance value.

20 Claims, 4 Drawing Sheets

SYSTEM AND METHOD FOR DETECTING CROSS BORES

CROSS-REFERENCE TO RELATED APPLICATIONS

This application claims the benefit of U.S. Provisional Application No. 62/474,769, filed Mar. 22, 2017, the disclosure of which is hereby incorporated in its entirety by reference herein.

TECHNICAL FIELD

The present invention relates to detecting underground, i.e., below ground surface, cross bores.

BACKGROUND

A variety of trenchless excavation technologies have been developed to increase installation efficiency of various underground utilities. Horizontal direction drilling (HDD), for example, is increasingly being used for utility line installations. Other popular trenchless excavation technologies include percussive moles and plowing. Trenchless excavation technologies have the advantage of not being disruptive to the surface, yards, roads, driveways, traffic, and trees, for example, but have the disadvantage of not allowing installers to see with their own eyes where utility lines are being installed.

A particularly concerning situation arises when a new utility is to be installed in a subsurface where an existing underground utility is located. In this scenario, a cross bore may arise. A cross bore is generally understood in the industry as an intersection of an existing underground utility or underground structure by a second utility resulting in direct contact between the transactions of the utilities that can compromise the integrity of either utility or underground structure.

By way of example, it sometimes occurs that a utility installation contractor using an HDD machine to install a gas service line inadvertently drills through or very near a main sewer or sewer lateral pipe and unknowingly installs a gas supply pipeline through or in contact with the sewer pipe. This direct or proximal unintended contact between underground utilities represents a cross bore. At some later date when a back-up occurs in the sewer, the owner might engage a sewer cleaner using a cutter device to clear the sewer. This can lead to a breach in the gas line and subsequent ignition of gas which flows into the sewer line.

It can be appreciated that installing new utilities within a subsurface that includes legacy utilities is problematic in cases where the location, size, orientation, type, material, and other characteristics of such legacy utilities are either uncertain or unknown. Sewer authorities may complain that newly constructed sewer lines are being damaged when underground utility lines are installed and utility installers may complain that sewers are not properly located or their locations are not accurately documented.

In view of the thousands of miles of sewers situated where utility lines have been installed with trenchless technologies, there may exist a legacy of thousands of cross bores of gas supply pipelines alone in sewers. In addition to gas explosion concerns, damage done to existing utilities due to cross bores is dramatic. For example, holes broken into sewers increases infiltration and inflow of water into sewers, creating structural deficiencies that may eventually create sinkholes and voids that may be extremely expensive to repair.

SUMMARY

Embodiments of the present invention are directed to systems and methods for detecting cross bores including legacy cross bores and cross bores occurring at the time of installation.

An embodiment provides an apparatus having a detector for detecting cross bores. The detector includes an electronic circuit module having a capacitance sensor. The apparatus further includes support which is part of a robot assembly, a push rod cable, a tether, etc. The detector is mounted to the support. In operation, the support with the detector mounted thereto are inserted into a non-metallic pipe of an underground (i.e., subterranean) utility and moved through the pipe. For instance, the support is self-propelled (e.g., motorized robot assembly), pushed with a push rod cable, or pulled with a tether through pipe to move with the detector mounted thereto through the pipe. For instance, the pipe is a gas pipe.

The detector utilizes a varying or alternating electric field, generated by the electronic circuit module, to detect the presence of absence of common embedment materials surrounding the gas pipe, as the detector is moved through the gas pipe. Such common embedment materials include soil, sand, gravel, rocks, clay, and concrete. In normal situations, the gas pipe is surrounded by the common embedment materials. Thus, in this case, when the detector detects the presence of common embedment materials surrounding the gas pipe it can be deduced therefrom that the situation is normal.

On the other hand, in abnormal situations, the gas pipe undesirably extends through another underground utility thereby creating a cross bore at the location of this insertion. For instance, the other underground utility is a sewer pipe. In this case, the sewer pipe, and not common embedment materials, surrounds the portion of the gas pipe extending through the sewer pipe at the location of the cross bore. Thus, common embedment materials surrounding the portion of the gas pipe extending through the sewer pipe at the location of the cross bore are absent. In this case, when the detector detects the absence of common embedment materials surrounding the gas pipe it can be deduced therefrom that the situation is abnormal (i.e., it can be deduced that a cross bore exists). Further, by knowing the location of the detector it can be deduced the location of the cross bore.

In an embodiment, an apparatus for detecting a cross-bore between a first pipe and a second pipe that are installed underground is provided. The apparatus includes a support and an electronic circuit assembly. The support is movable through the first pipe. The electronic circuit assembly is mounted to the support to move through the first pipe with the support. The electronic circuit assembly includes a controller and a capacitance sensor. The capacitance sensor is configured to output to the controller a capacitance value based on an interaction of an electric field generated by the capacitance sensor with an environment of the first pipe. The capacitance sensor outputs to the controller a given capacitance value when the capacitance sensor is at a location where the environment of the first pipe is a cross-bore intersection with the second pipe. The controller is configured to generate an indicator indicative of a presence of a cross-bore upon the capacitance sensor outputting the given capacitance value.

The controller may be further configured to pause the support from moving through the first pipe upon the capacitance sensor outputting the given capacitance value.

The electronic circuit assembly may further include a beacon. The controller may be further configured to activate the beacon to transmit a wireless signal for receipt by a receiver aboveground upon the capacitance sensor outputting the given capacitance value.

The electronic circuit assembly may further include a global positioning sensor (GPS) locator configured to output to the controller a position signal indicative of the location of the capacitance sensor. The controller may be further configured to generate with the indicator an indication of a location of the cross-bore as being the location of the capacitance sensor when the capacitance sensor outputs the given capacitance value.

The electronic circuit assembly may further include a camera, a gyroscope, and/or an accelerometer for positioning collection operations and/or data collection operations.

The electronic circuit assembly may further include multiple capacitance sensors.

The capacitance sensor may be a mutual capacitance sensor or a self-capacitance sensor. The electric field generated by the capacitance sensor may be a varying or alternating electric field.

The support may be a part of a robotics assembly, a pushrod, and/or a tether.

In an embodiment, an apparatus for detecting a cross-bore between a first pipe and a second pipe that are installed underground is provided. The apparatus includes a support and an electronic circuit assembly. The support is movable through the first pipe. The electronic circuit assembly is mounted to the support to move through the first pipe with the support. The electronic circuit assembly includes a controller and a capacitance sensor. The capacitance sensor is configured to output to the controller a capacitance value at each location of the capacitance sensor based on an interaction of an electric field generated by the capacitance sensor with an environment of the first pipe at the location of the capacitance sensor. The capacitance sensor outputs a first capacitance value when the capacitance sensor is at a location where the environment of the first pipe is underground embedment materials and outputs a second capacitance value when the capacitance sensor is at a location where the environment of the first pipe is a cross-bore intersection with the second pipe. The first and second capacitance values are different as (i) the underground embedment materials and (ii) the cross-bore intersection with the second pipe interact differently with the electric field generated by the capacitance sensor. The controller is configured to generate an indicator indicative of a presence of a cross-bore when the capacitance sensor outputs the second capacitance value after having outputted the first capacitance value.

In an embodiment, a method for detecting a cross-bore between a first pipe and a second pipe that are installed underground is provided. The method includes moving a capacitance sensor through the first pipe. The method further includes outputting by the capacitance sensor a first capacitance value based on an interaction of an electric field generated by the capacitance sensor with an environment of the first pipe when the capacitance sensor is at a location where the environment of the first pipe is underground embedment materials. The method further includes outputting by the capacitance sensor a second capacitance value based on the interaction of the electric field with the environment of the first pipe when the capacitance sensor is at a location where the environment of the first pipe is a cross-bore intersection with the second pipe. The first and second capacitance values are different as the (i) underground embedment materials and (ii) the cross-bore intersection interact differently with the electric field. The method further includes generating an indicator indicative of a presence of a cross-bore when the capacitance sensor outputs the second capacitance value after the capacitance sensor having outputted the first capacitance value.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As indicated, a cross bore includes an intersection of a first underground utility (e.g., a sewer line) by a second underground utility (e.g., a gas line) resulting in direct contact (i.e., the intersection) between the transactions of the utilities which compromises the integrity of either or both utilities. Installation operations such as HDD can unknowingly cause a gas pipeline to be inserted through an existing underground utility such as an existing sewer pipe Certain types of existing utilities in the path of a new installation are identified and located before the drilling operation. Available locating technologies are typically focused on detecting metallic pipes or pipes buried with a metallic tracer wire. Sewer pipes, however, are generally non-metallic and are commonly not installed with metallic tracer wires. Consequently, installations occur in which a gas pipe has been unintentionally inserted through a sewer pipe with no one being aware of this cross bore. A subsequent sewer line cleaning process can damage or rupture the gas pipe such as to result in a gas leakage through the sewer pipe. Gas leaking from the damaged or ruptured gas pipe could enter through the sewer pipe into a house or building connected to the sewer pipe thereby posing serious safety concerns.

Figure 1:
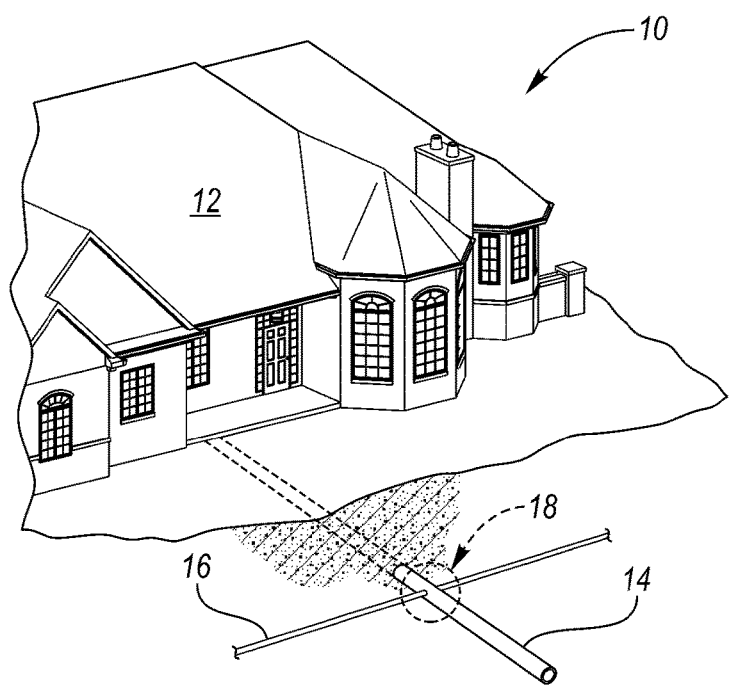
FIG. 1 illustrates a schematic diagram of an environment including a house provided with sewer and gas services, including a lateral sewer line and a main gas line with the main gas line intersecting the lateral sewer line thereby resulting in a (sewer) cross bore at the location of the intersection.

FIG. 1 illustrates a schematic diagram of an environment 10 including a house 12 provided with sewer and gas services. A lateral sewer line (i.e., a sewer pipe) 14 is connected to house 12 to provide sewer services to the house. Lateral sewer line 14 is located underground. A main gas line (i.e., a gas pipe) 16 provides gas to house 12 via a lateral gas line (not shown) connected to the house. Main gas line 16 is also located underground.

As shown in FIG. 1, a problem exists in that main gas line 16 intersects (i.e., literally extends through) lateral sewer line 14. A (sewer) cross bore 18 thus results at the location of the intersection. Cross bore 18 may be formed by trenchless drilling of a gas bore for main gas line 16 which penetrates through lateral sewer line 14 and subsequently installing main gas line 16 in the gas bore.

It should be understood in FIG. 1 and elsewhere herein that the sewer and gas lines are used as examples of the types of underground utilities. Either or both could be substituted for other types of underground utilities such as water, electrical, communications, etc.

Figure 2:
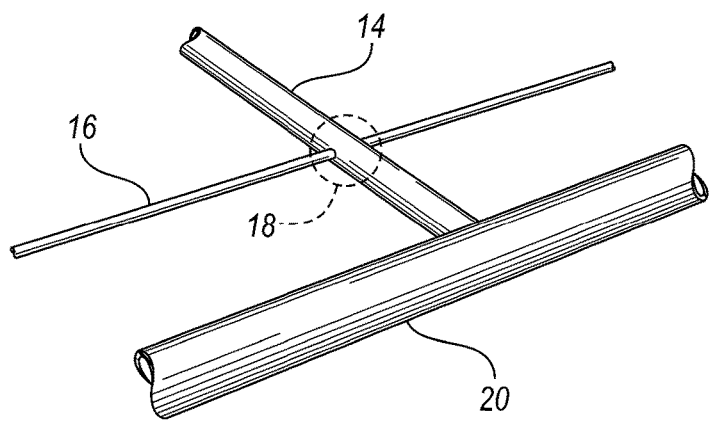
FIG. 2 illustrates a schematic diagram of the main gas line intersecting the lateral sewer line thereby resulting in the cross bore at the location of the intersection, the lateral sewer line leading into a main sewer line.

FIG. 2 illustrates a schematic diagram of main gas line 16 intersecting lateral sewer line 14 thereby resulting in cross bore 18 at the location of the intersection. Lateral sewer line 14 at one end leads into a main sewer line (i.e., a second sewer pipe) 20. Lateral sewer line 14 at another end leads into house 12 as shown in FIG. 1.

As illustrated in FIG. 2, the gas line intersecting lateral sewer line 14 is main gas line 16. Of course, a different gas line such as a lateral gas line could have been depicted in FIG. 2 as intersecting lateral sewer line 14 thereby resulting in cross bore 18.

Figure 3:
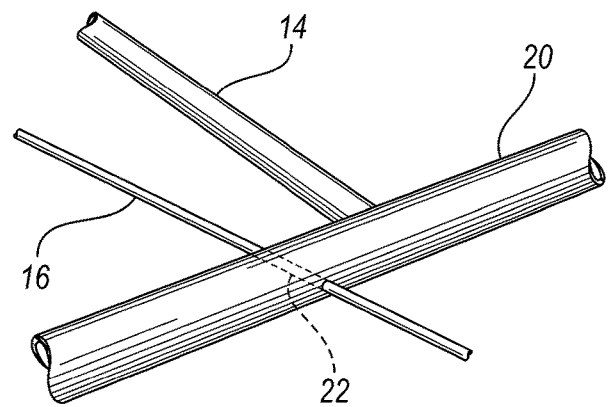
FIG. 3 illustrates a schematic diagram of the main gas line intersecting the main sewer line thereby resulting in a cross bore at the location of the intersection.

FIG. 3 illustrates a schematic diagram of main gas line 16 intersecting main sewer line 20 thereby resulting in a cross bore 22 at the location of the intersection. Of course, a different gas line such as a lateral gas line could have been depicted in FIG. 3 as intersecting main sewer line 20 thereby resulting in cross bore 22.

Figure 4:
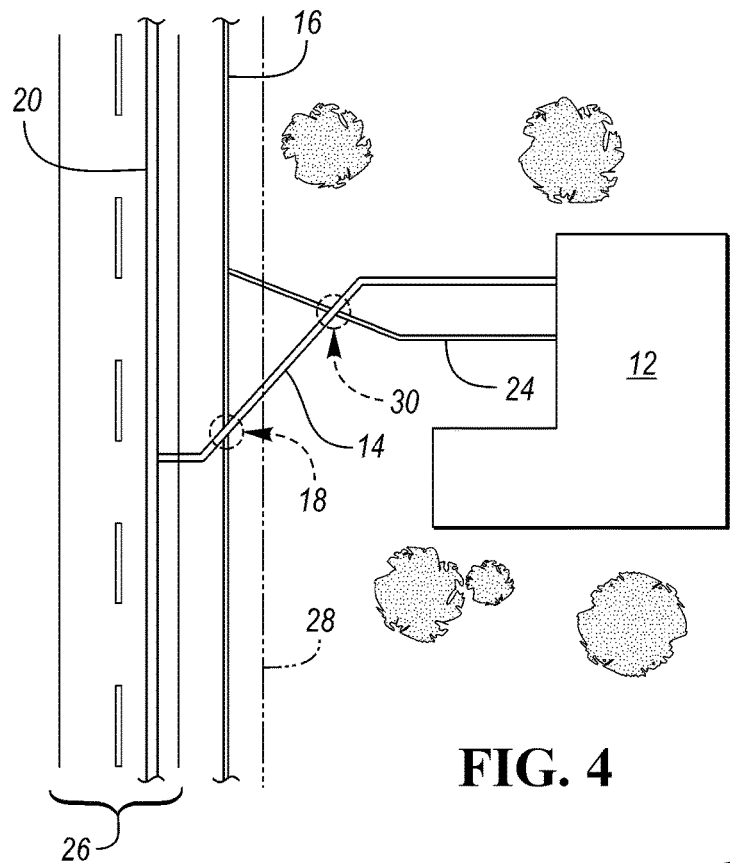
FIG. 4 illustrates a plan view of the house connected to the lateral sewer line and a lateral gas line and located in a neighborhood having the main sewer line and the main gas line, the lateral gas line intersecting the lateral sewer line thereby resulting in a first cross bore at the location of this intersection and the main gas line intersecting the lateral sewer line thereby resulting in a second cross bore at the location of this intersection.

FIG. 4 illustrates a plan view of house 12 connected to lateral sewer line 14 and a lateral gas line 24 and located in a neighborhood having main sewer line 20 and main gas line 16. Main sewer line 20 is buried beneath a street 26. Main gas line 16 is buried between street 26 and a property line 28 of house 12.

Two cross bore situations exist in FIG. 4. First, lateral gas line 24 intersects lateral sewer line 14 thereby resulting in a cross bore 30 at the location of this intersection. Second, main gas line 16 intersects lateral sewer line 14 thereby resulting in cross bore 18 at the location of this intersection.

Figure 5:
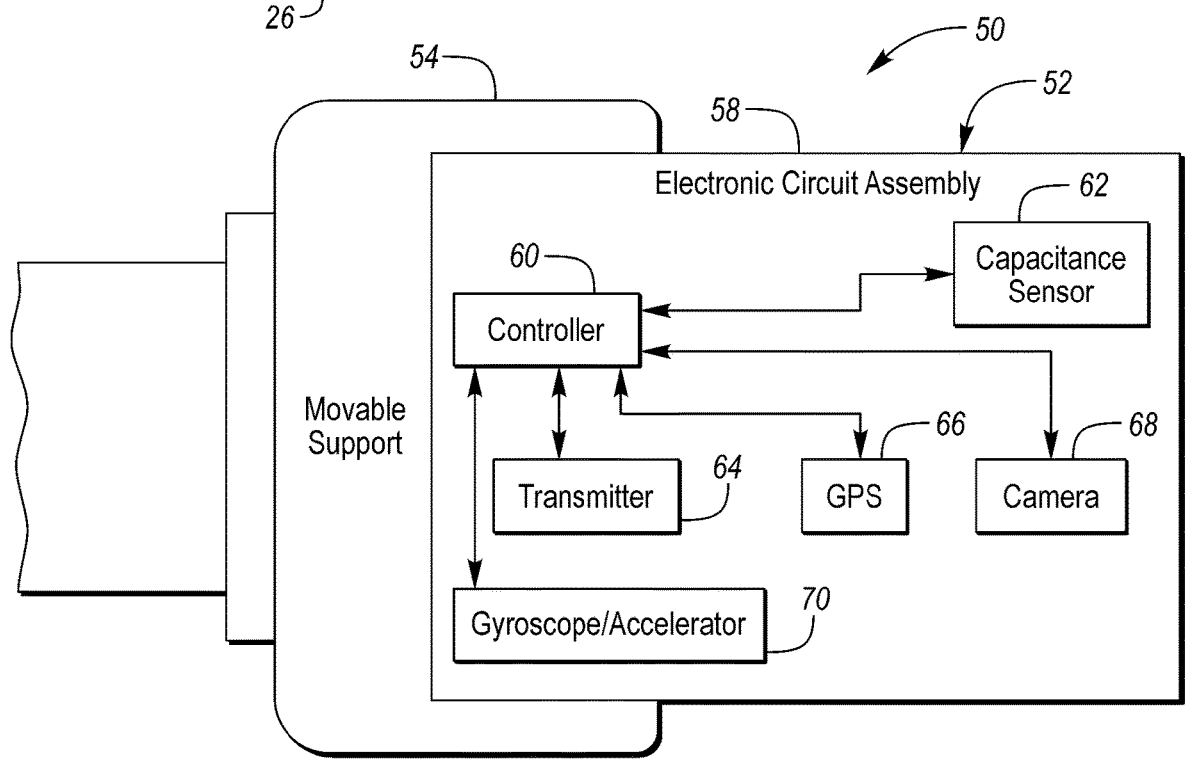
FIG. 5 illustrates a block diagram of an apparatus having a detector for detecting cross bores.

Referring now to FIG. 5, a block diagram of an apparatus 50 having a detector 52 for detecting cross bores in accordance with embodiments of the present invention will now be described. Detector 52 is used to detect a cross-bore between a first pipe and a second pipe that are installed underground.

Apparatus 50 includes a movable support 54. Movable support 54 may be a part of a robotics assembly, a pushrod, and/or a tether. Movable support 54 is movable through pipes. For example, movable support 54 is movable through the first pipe. Detector 52 is mounted to movable support 54 to move through the first pipe with the movable support.

Detector 52 includes an electronic circuit assembly 58 having a controller 60 and a capacitance sensor 62. Capacitance sensor 62 outputs to controller 60 a capacitance value at each location of the capacitance sensor based on an interaction of an electric field generated by the capacitance sensor with an environment of the first pipe at the location of the capacitance sensor. The capacitance value outputted by capacitance sensor 62 when the capacitance sensor is at a location where the environment of the first pipe is a cross-bore intersection with the second pipe is a given capacitance value indicative of the cross-bore intersection between the first and second pipes. For instance, the given capacitance value is a capacitance value(s) falling within a predetermined or calculated capacitance value range when the capacitance sensor is at a location where the environment of the first pipe is a cross-bore intersection with the second pipe. Controller 60 generates an indicator or an alert indicative of a presence of a cross-bore upon capacitance sensor 62 outputting the given capacitance value. Controller 60 may be in hard-wire or wireless communication with an operator control computer aboveground.

Controller 60 may generate a control signal to pause movable support 54 from moving through the first pipe upon capacitance sensor 62 outputting the given capacitance value. In this way, the location of capacitance sensor 62, and hence the location of the cross-bore, may be determined.

Electronic circuit assembly 52 may further include a beacon ("transmitter") 64. Transmitter 64 may be a stand-alone transmitter or may be a part of a wireless transceiver. Controller 60 may activate transmitter 64 to transmit a wireless signal for receipt by a receiver aboveground upon capacitance sensor 62 outputting the given capacitance value. In this way, the location of capacitance sensor 62, and hence the location of the cross-bore, may be determined.

Transmitter 64 functions as a beacon designed to enable detector 52 to be accurately located from above the ground. A displacement encoder on a tether or pushrod yields an accurate straight-line displacement location. However, horizontal directional drilling allows for drill steering. Thus, if the subject pipe is not installed in a straight line, then an actual location of detector 52 cannot be derived using a displacement encoder. In this case, the beacon is activated to wirelessly transmit a beacon signal and another piece of equipment (generically called a "locator") is used to locate the beacon, and thereby locate detector 52, from above the ground. The locator contains an advanced global positioning sensor (GPS) system which allows a point of interest to be accurately recorded.

Although getting an accurate GPS location underground is difficult, this could change in the future. Hence, electronic circuit assembly 52 may further include a global positioning sensor (GPS) locator 66. GPS locator 66 outputs to controller 60 a position signal indicative of the location of capacitance sensor 62. Controller 60 generates with the indicator an indication of a location of the cross-bore as being the location of capacitance sensor 62 when the capacitance sensor outputs the given capacitance value.

Electronic circuit assembly 52 may further include a camera 68 for data collection operations. Electronics circuit assembly 52 may further include a gyroscope and/or an accelerometer, collectively designated with reference numeral 70, for positioning collection operations.

Referring now to FIGS. 6A and 6B and FIGS. 7A and 7B, with continual reference to FIG. 5, more detailed operation of detector 52 of apparatus 50 in detecting cross bores in accordance with embodiments of the present invention will now be described. As described, detector 52 includes electronic circuit assembly 58 having capacitance sensor 62. As described, apparatus 50 further includes movable support 54 that is part of a robot assembly or a pushrod/tether. Detector 52 is mounted to robot assembly or the end of the pushrod/tether.

Figure 6A:
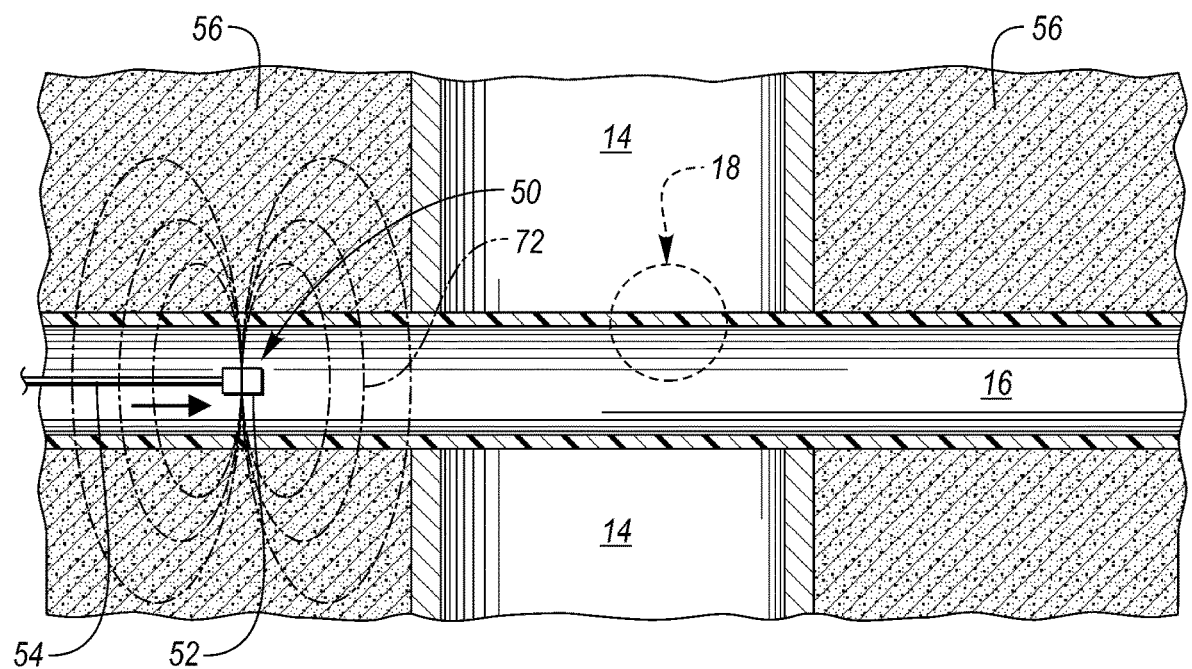
FIGS. 6A and 6B illustrate block diagrams of an apparatus having a detector including a capacitance sensor in the form of a mutual capacitance sensor for detecting cross bores in which the detector is inserted into a non-metallic, underground pipe, such as a gas pipe, and is moved through gas pipe from a first location (FIG. 6A) in which common embedment materials surround the gas pipe to a second location (FIG. 6B) in which another underground utility, such as a sewer pipe, surrounds the gas pipe due to the gas pipe undesirably extending through the sewer pipe thereby creating a cross bore at the second location.
Figure 6B:
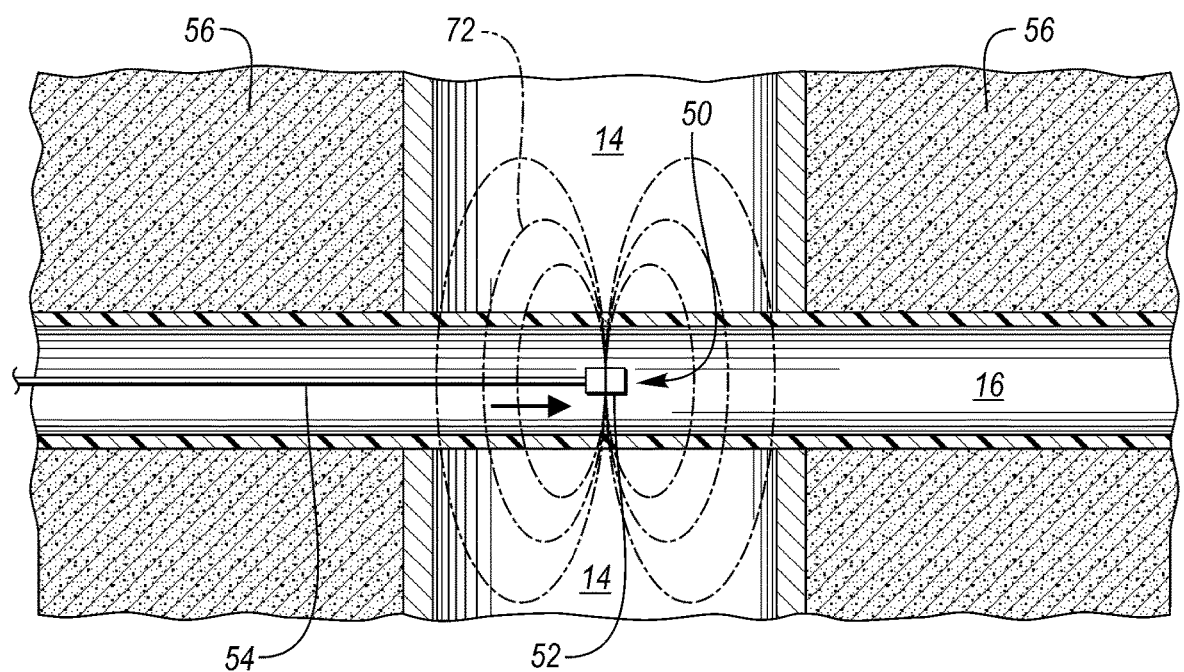
Figure 7A:
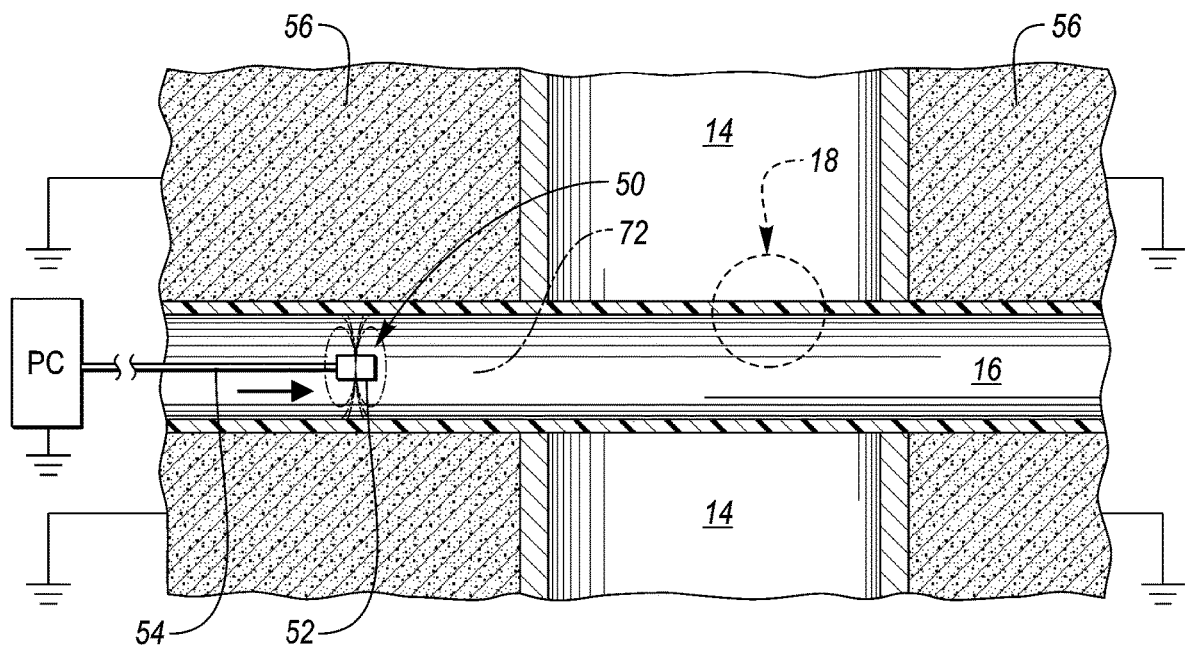
FIGS. 7A and 7B illustrate block diagrams of an apparatus having a detector including a capacitance sensor in the form of a self-capacitance sensor for detecting cross bores in which the detector is inserted into the underground gas pipe and is moved through the gas pipe from a first location (FIG. 7A) in which common embedment materials surround the gas pipe to a second location (FIG. 7B) in which the sewer pipe surrounds the gas pipe due to the gas pipe undesirably extending through the sewer pipe thereby creating a cross bore at the second location.
Figure 7B:
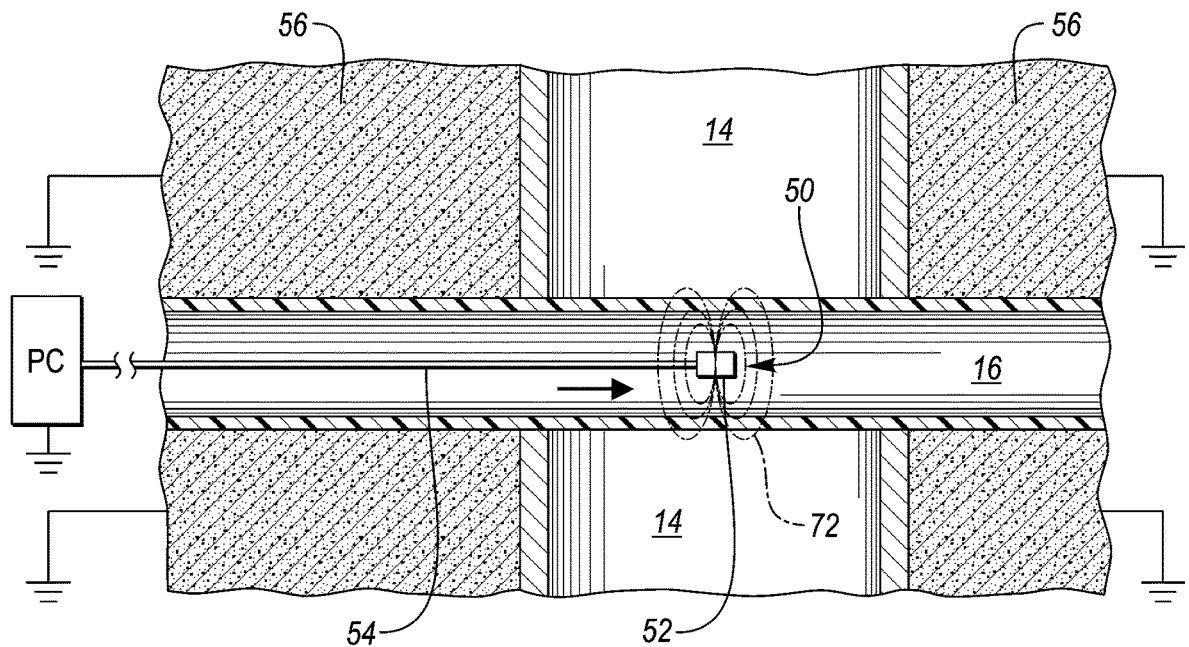

As shown in FIGS. 6A and 6B and FIGS. 7A and 7B, the robot assembly or pushrod/tether having movable support 54 with detector 52 mounted thereto is inserted into a non-metallic pipe (i.e., a first pipe) of an underground utility. For instance, the first pipe is main gas line 16. In operation, detector 52 is moved through main gas line 16 from a first location (FIG. 6A; FIG. 7A) to a second location (FIG. 6B; FIG. 7B).

Capacitance sensor 62 of detector 52 utilizes a varying or alternating electric field to detect the presence or absence of common embedment materials 56 surrounding main gas line 16. In normal situations, main gas line 16 is surrounded by embedment materials 56. Thus, in this case, when detector 52 is located at the first location (FIG. 6A; FIG. 7A) and detects the presence of embedment materials 56 surrounding main gas line 16, it can be deduced therefrom that the situation is normal.

In abnormal situations, main gas line 16 undesirably extends through another underground utility such as lateral sewer line 14 (i.e., a second pipe) thereby creating cross bore 18 at this location. In this case, lateral sewer line 14, and not embedment materials 54, surrounds the portion of main gas line 16 extending through lateral sewer line 14 at the location of cross bore 18. Thus, embedment materials 56 surrounding the portion of main gas line 16 extending through lateral sewer line 14 at the location of cross bore 18 are absent. In this case, when detector 52 is located at the second location (FIG. 6B; FIG. 7B) and detects the absence of embedment materials 56 surrounding main gas line 16, it can be deduced therefrom that the situation is abnormal (i.e., it can be deduced that cross bore 18 exists). Further, by knowing the location of detector 52 it can be deduced the location of cross bore 18.

More particularly, detector 52 uses the varying or alternating electric field to detect the presence or absence of embedment materials 56 by measuring the change in capacitance at one or more of the electrodes of capacitance sensor 62 used to generate the electric field. A change in capacitance can occur by two methods. The first method involves a change in the dielectric constant of the volume traversed by the electric field. The second method involves a change in the relative geometric structure (surface area and separation) of the electric field generating electrodes.

FIGS. 6A and 6B depict the change in dielectric constant of the volume traversed by the electric field from a properly embedded pipe (FIG. 6A) to an improperly embedded pipe (FIG. 6B). In this case, capacitance sensor 62 of detector 52 is in the form of a mutual capacitance sensor. The mutual capacitance sensor generally includes an isolated transmitter and a receiver which generate an electric field between them. The object to be sensed passes through the field and changes the dielectric constant.

In a proper embedment shown in FIG. 6A, electric field lines 72 generated by capacitance sensor 62 when the capacitance sensor is at the location shown in FIG. 6A pass through the dielectric constant $K_e$ of embedment materials 56. In an improper embedment shown in FIG. 6B, electric field lines 72 generated by capacitance sensor 62 when the capacitance sensor is at the location shown in FIG. 6B pass through the dielectric constant $K_v$ of lateral sewer line 14 (i.e., a hollow, pre-existing structure). The dielectric constant $K_e$ of embedment materials 56 traversed by electric field lines 72 does not equal the dielectric constant $K_v$ of the volume traversed by the electric field lines in the contents of main gas line 16. Thus, the capacitance measured by electronic circuit assembly 58 while in a properly embedded section of main gas line 16 (shown in FIG. 6A) is not equivalent to the capacitance measured by the electronic circuit assembly while in an improperly embedded section of the main gas line (shown in FIG. 6B).

That is, capacitance sensor 62 outputs a first capacitance value when the capacitance sensor is at a location where the environment of main gas line 16 is underground embedment materials 56 (shown in FIG. 6A). Capacitance sensor 62 outputs a second capacitance value when the capacitance sensor is at a location where the environment of main gas line 16 is a cross-bore 18 intersection with lateral sewer line 14 (shown in FIG. 6B). The first capacitance value and the second capacitance value are different capacitance values as (i) underground embedment materials 56 and (ii) cross-bore 18 intersection with lateral sewer line 14 interact differently with electric field lines 72 generated by capacitance sensor 62.

FIGS. 7A and 7B depict the change in relative geometric structure of the electric field generating electrodes from a properly embedded pipe (FIG. 7A) to an improperly embedded pipe (FIG. 7B). In this case, capacitance sensor 62 of detector 52 is in the form of a self-capacitance sensor. The self-capacitance sensor couples the receiver to the earth ground so that any object coupled or connected to earth ground comes into proximity of the receiver and becomes another receiver. An additional receiver changes the geometric structure (size and separation of transmitter and receiver) of the sensor and consequently the capacitance of the sensor.

In a proper embedment shown in FIG. 7A, embedment materials 56 has an intrinsic connection to earth ground and thus the embedment materials are coupled to the electric field generating electrode structure of capacitance sensor 62 when the capacitance sensor is at the location shown in FIG. 7A. In an improper embedment shown in FIG. 7B, the contents of the hollow, pre-existing structure (i.e., lateral sewer line 14) are not coupled to the electric field generating electrode structure of capacitance sensor 62 when the capacitance sensor is at the location shown in FIG. 7B. The electric field generating electrode structure of capacitance sensor 62 surrounded by embedment materials 56 does not equal the electric field generating electrode structure of the capacitance sensor surrounded by the contents of lateral sewer line 14. Thus, the capacitance measured by electronic circuit assembly 58 while in a properly embedded section of main gas line 16 (shown in FIG. 7A) is not equivalent to the capacitance measured by the electronic circuit assembly while in an improperly embedded section of the main gas line (shown in FIG. 7B).

Detector 52 can thereby be used to verify that a subterranean, non-metallic pipe has been properly embedded during the installation process. Detector 52 can detect a non-metallic pipe that has been improperly embedded in such a way that the improperly embedded pipe is passing through a hollow pre-existing structure such as another pipe, tank, vent, drain, vault, or service port. An improperly embedded pipe can be mistaken for a common obstruction, such as a tree root, in a pre-existing structure. If an improperly embedded pipe is placed into service, subsequently treated as a common obstruction, and forcibly removed from the pre-existing structure, then the unintended consequences can be disastrous when the improperly embedded pipe is transporting explosive or poisonous materials.

Detector 52 allows for efficient inspection from inside the subject pipe at the time of installation as well as post installation. Detector 52 also affords the possibility of post installation inspection while the subject pipe remains in service.

As described, detector 52 may be mounted to a self-powered robotic system or attached to a push rod cable (end). The ways in which detector 52 is mounted may involve providing a carriage (e.g., movable support 54) for detector 52 in which the carriage has spring or pneumatically loaded wheels (which push against the inner circumference of the pipe) on it or another mechanism to center the detector. Apparatus 50 may be used with a launching system for vertical, angular, or horizontal launch. This launcher may be gas tight or not pending the application. Apparatus 50 may go into the open end of a pipe under "dead" conditions.

Capacitance sensor 62 of detector 52 may be a single capacitance sensor 62 or a full array of any amount of capacitance sensors 62 at any given orientation. In this regard, to detect the largest percentage change of capacitance, the field of view of the capacitance sensor is to be narrowed. This can be accomplished by either rotating a single sensor around the interior of the pipe or by creating an array of capacitance sensors 62. An array of capacitance sensors 62 not only provides a relatively better signal to noise ratio (SNR), but also provides an indication of the geometry (dimensions and orientation) of detected cross bores.

Apparatus 50 may be part of a semi or fully automated system. This could be achieved by having the push drive automatically be "pushed"/driven into the pipe. When a cross bore is detected, the system would pause and alert an operator (via a light, a video display, other user interfaces, etc.). The operator could then act. The action may include locating the sensor head from above ground using a low frequency (LF) receiver to detect a transmitter built into the transport mechanism of apparatus 50 (and/or to detect transmitter 64 of detector 52). A robotic carriage may also be automated.

As indicated above, detector 52 may include one or more capacitance sensors deployed in an array. Deployment methods which may be utilized include mounting the sensor(s) on the end of a push rod or rigid cable, the push rod or the rigid cable may or may not have a motorized pushing/feeding system; connecting the sensor(s) to a motorized transport platform or robotic system; positioning the sensor(s) through an under-pressure gland system or launch system mounted at any given orientation to the pipeline; deploying the sensor(s) by means which center the sensor(s) in the pipeline, the means may include (i) springs, pneumatics, or motors and/or (ii) mechanical bracketing; deploying the sensor(s) by means which position the sensor(s) at a specified distance from the pipe wall; deploying the sensor(s) without a means of positioning (i.e., free floating); and deploying the sensor (s) in a rotatable configuration.

In other embodiments, detector 52 may be accompanied by a camera 68, a beacon or transmitter 64, a transmitter such as a sonde, a global positioning sensor (GPS) locator 66, a gyroscope and/or an accelerometer 70, or other sensors such as sensors for positioning and data collection operations.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. An apparatus for detecting a cross-bore between a first pipe and a second pipe that are installed underground, the apparatus comprising:
   a support that is movable through the first pipe;
   an electronic circuit assembly mounted to the support to move through the first pipe with the support, the electronic circuit assembly including a controller and a capacitance sensor;
   the capacitance sensor is configured to output to the controller a capacitance value based on an interaction of an electric field generated by the capacitance sensor with an environment of the first pipe;
   wherein the capacitance sensor outputs to the controller a given capacitance value when the capacitance sensor is at a location where the environment of the first pipe is a cross-bore intersection with the second pipe; and
   the controller is configured to generate an indicator indicative of a presence of a cross-bore upon the capacitance sensor outputting the given capacitance value.

2. The apparatus of claim 1 wherein:
   the controller is further configured to pause the support from moving through the first pipe upon the capacitance sensor outputting the given capacitance value.

3. The apparatus of claim 1 wherein:
   the electronic circuit assembly further includes a beacon; and
   the controller is further configured to activate the beacon to transmit a wireless signal for receipt by a receiver aboveground upon the capacitance sensor outputting the given capacitance value.

4. The apparatus of claim 1 wherein:
   the electronic circuit assembly further includes a global positioning sensor (GPS) locator configured to output to the controller a position signal indicative of the location of the capacitance sensor; and
   the controller is further configured to generate with the indicator an indication of a location of the cross-bore as being the location of the capacitance sensor when the capacitance sensor outputs the given capacitance value.

5. The apparatus of claim 1 wherein:
the electronic circuit assembly further includes at least one of a gyroscope and an accelerometer.

6. The apparatus of claim 1 wherein:
the electronic circuit assembly further includes a camera.

7. The apparatus of claim 1 wherein:
the electronic circuit assembly further includes a plurality of capacitance sensors.

8. The apparatus of claim 1 wherein:
the capacitance sensor is a mutual capacitance sensor.

9. The apparatus of claim 1 wherein:
the capacitance sensor is a self-capacitance sensor.

10. The apparatus of claim 1 wherein:
the electric field generated by the capacitance sensor is a varying or alternating electric field.

11. The apparatus of claim 1 wherein:
the support is a part of a robotics assembly.

12. The apparatus of claim 1 wherein:
the support is a part of either a pushrod or a tether.

13. An apparatus for detecting a cross-bore between a first pipe and a second pipe that are installed underground, the apparatus comprising:
a support that is movable through the first pipe;
an electronic circuit assembly mounted to the support to move through the first pipe with the support, the electronic circuit assembly including a controller and a capacitance sensor;
the capacitance sensor is configured to output to the controller a capacitance value at each location of the capacitance sensor based on an interaction of an electric field generated by the capacitance sensor with an environment of the first pipe at the location of the capacitance sensor;
wherein the capacitance sensor outputs a first capacitance value when the capacitance sensor is at a location where the environment of the first pipe is underground embedment materials and outputs a second capacitance value when the capacitance sensor is at a location where the environment of the first pipe is a cross-bore intersection with the second pipe, the first capacitance value and the second capacitance value being different capacitance values as (i) the underground embedment materials and (ii) the cross-bore intersection with the second pipe interact differently with the electric field generated by the capacitance sensor; and
the controller is configured to generate an indicator indicative of a presence of a cross-bore when the capacitance sensor outputs the second capacitance value after having outputted the first capacitance value.

14. The apparatus of claim 13 wherein:
the controller is further configured to pause the support from moving through the first pipe upon the capacitance sensor outputting the second capacitance value after having outputted the first capacitance value.

15. The apparatus of claim 13 wherein:
the electronic circuit assembly further includes a beacon; and
the controller is further configured to activate the beacon to transmit a wireless signal for receipt by a receiver aboveground upon the capacitance sensor outputting the second capacitance value after having outputted the first capacitance value.

16. The apparatus of claim 13 wherein:
the electronic circuit assembly further includes a global positioning sensor (GPS) locator configured to output to the controller a positioning signal indicative of the location of the capacitance sensor; and
the controller is further configured to generate with the indicator an indication of the cross-bore being at a location corresponding to the location of the capacitance sensor when the capacitance sensor outputs the second capacitance value.

17. A method for detecting a cross-bore between a first pipe and a second pipe that are installed underground, the method comprising:
moving a capacitance sensor through the first pipe;
outputting by the capacitance sensor a first capacitance value based on an interaction of an electric field generated by the capacitance sensor with an environment of the first pipe when the capacitance sensor is at a location where the environment of the first pipe is underground embedment materials;
outputting by the capacitance sensor a second capacitance value based on the interaction of the electric field with the environment of the first pipe when the capacitance sensor is at a location where the environment of the first pipe is a cross-bore intersection with the second pipe, wherein the first capacitance value and the second capacitance value are different as (i) the underground embedment materials and (ii) the cross-bore intersection interact differently with the electric field; and
generating an indicator indicative of a presence of a cross-bore when the capacitance sensor outputs the second capacitance value after the capacitance sensor having outputted the first capacitance value.

18. The method of claim 17 further comprising:
pausing the capacitance sensor from moving through the first pipe upon the capacitance sensor outputting the second capacitance value after the capacitance sensor having outputted the first capacitance value.

19. The method of claim 17 further comprising:
transmitting a signal for receipt by a receiver aboveground upon the capacitance sensor outputting the second capacitance value after the capacitance sensor having outputted the first capacitance value.

20. The method of claim 17 wherein:
using a global positioning sensor (GPS) locator to output a position signal indicative of the location of the capacitance sensor; and
generating with the indicator an indication of the cross-bore being at a location corresponding to the location of the capacitance sensor when the capacitance sensor outputs the second capacitance value.

* * * * *